United States Patent [19]

Petrow et al.

[11] 4,044,193

[45] Aug. 23, 1977

[54] FINELY PARTICULATED COLLOIDAL PLATINUM COMPOUND AND SOL FOR PRODUCING THE SAME, AND METHOD OF PREPARATION OF FUEL CELL ELECTRODES AND THE LIKE EMPLOYING THE SAME

[75] Inventors: Henry G. Petrow, Watertown; Robert J. Allen, Saugus, both of Mass.

[73] Assignee: Prototech Company, Newton, Mass.

[21] Appl. No.: 534,731

[22] Filed: Dec. 20, 1974

Related U.S. Application Data

[63] Continuation-in-part of Ser. No. 153,824, June 16, 1971, abandoned, which is a continuation of Ser. No. 430,190, Dec. 28, 1973, abandoned.

[51] Int. Cl.$^2$ .................. H01M 8/00; H01M 4/86; H01M 4/88
[52] U.S. Cl. .................................. 429/40; 429/42; 429/44
[58] Field of Search ............... 136/120 FC; 252/447; 75/22, 102; 429/40, 42, 44

[56] References Cited

U.S. PATENT DOCUMENTS

| | | | |
|---|---|---|---|
| 2,283,198 | 5/1942 | Fink et al. | 75/102 |
| 3,291,753 | 12/1966 | Thompson | 252/447 |
| 3,437,431 | 4/1969 | Platz | 423/22 |
| 3,629,145 | 12/1971 | Morikawa | 252/447 |
| 3,804,779 | 4/1974 | Kent et al. | 252/447 |
| 3,857,737 | 12/1974 | Kemp et al. | 136/120 FC |

OTHER PUBLICATIONS

Foundations of College Chemistry, Murphy and Rousseau, pp. 648–649, 1969.

*Primary Examiner*—John H. Mack
*Assistant Examiner*—H. A. Feeley
*Attorney, Agent, or Firm*—Rines and Rines, Shapiro and Shapiro

[57] ABSTRACT

This disclosure deals with novel very fine, particulated colloidal platinum of the 15–25 Angstrom size range of unusual catalytic activity and particularly adapted for adsorption or other deposition upon carbon for use as fuel cell catalytic electrodes and the like and produced from platinum colloids and sols including complex platinum sulfite compounds and sols derived therefrom.

34 Claims, No Drawings

FINELY PARTICULATED COLLOIDAL PLATINUM COMPOUND AND SOL FOR PRODUCING THE SAME, AND METHOD OF PREPARATION OF FUEL CELL ELECTRODES AND THE LIKE EMPLOYING THE SAME

This application is a continuation-in-part of parent aplicaton Ser. No. 153,824, filed June 16, 1971 now abandoned and continued as application Ser. No. 430,190, filed Dec. 28, 1973, now abandoned and is filed in response to a Patent Office requirement for restriction or division in connection with catalytic fuel cell electrodes and preparation methods thereof and the like, with supplemental material.

The present invention relates to new platinum compounds, sols and particulated platinum deposits derived therefrom and to methods of preparing the same, being specifically, though not exclusively, concerned with use in fuel cell electrode preparation and the like.

The art is, of course, replete with numerous compounds and processes employed to provide platinum deposits for use as catalysts in a myriad of applications including oxidation, hydrogenation, dehydrogenation, reforming, cracking, chemical reaction-aiding, contaminant burning, electrochemical cell electrode operation and the like, all hereinafter generically connoted by reference to "catalytic" usage. Particulated platinum has been emloyed to provide increased effective surface area, as by adherence to rough substrata, such as carbon, alumina and other substances, such deposits being obtained from compounds such as platinum tetrachloride, chloroplatinic acid and the like. As described, for example in *Actes Du Deuxieme Congres International De Catalyse*, Paris, 1960, pp. 2236, 2237, the average particle size of such particulated platinum lies in the range of from about 45 to 250 Angstroms, and it has not proven possible commercially to provide much smaller particles and thus obtain vastly increased catalytic efficiency.

In accordance with discoveries underlying the present invention, however, it has, in summary, now been found possible consistently to produce excellently adhering particulated platinum deposits in the much finer 15-25 Angstrom range; and it is to new methods, compounds and sols for producing the same that the present invention is accordingly primarily directed.

A further object of the invention is to provide a novel complex platinum acid compound and colloidal sol of more general application, as well.

Still another object is to provide novel catalytic structures to which such finely deposited platinum particles are adsorbed and adhered.

The present application is particularly directed to catalytic fuel cell electrodes and the like and methods of preparing the same that use or employ derivatives of such novel complex platinum compounds and the like.

Other and further objects will be explained hereinafter and are more particularly delineated in the appended claims.

A first discovery underlying a part of the invention resides in the rather unexpected fact that a novel complex platinum sulphite acid void of chlorine may be prepared from chloroplatinic acid and particularly adapted for the formation of a colloidal sol from which extremely finely particulated platinum may be deposited. While prior experience had led those skilled in the art to consider either that adding $SO_2$ to chloroplatinic acid would invariably result in reducing the platinum to the "2" state, without replacing chloride in the complex with $SO_3^=$, yielding chloroplatinous acid (see, for example, H. Remy, *Treatise on Inorganic Chemistry*, Vol. 2, p. 348), or that the reaction of $SO_2$ with a platinum compound resulted in its reduction to the metallic or zero valence state ("Applied Colloidal Chemistry", W. N. Bankcroft, McGraw Hill, 1926, p. 54), it has been discovered that through appropriate pH and other controls, a complex platinum acid containing sulphite (and to the complete exclusion of chloride) is decidedly achievable. And from such complex acid, unusual colloidal sols depositing particulate platinum in the 15-25 Angstrom range can readily be obtained, and thus vastly superior catalytic performance attained.

Specifically, one of the preferred methods for the preparation of this novel complex platinum acid (represented substantially by a formula containing two moles of $SO_3^=$ per mole of platinum) involves the neutralizing of chloroplatinic acid with sodium carbonate, forming orange-red $Na_2Pt$ $(Cl)_6$. Sodium bisulfite is then added, dropping the pH to about 4, and with the solution changing to pale yellow and then to a substantially colorless shade. Adding more sodium carbonate brings the pH back to neutral (7), and a white precipitate forms in which the platinum has been found to be contained in excess of 99% of the platinum contained in the chloroplatinic acid starting sample. It was believed (now confirmed) that this precipitate contains six atoms of sodium and four moles of $SO_3^=$ per atom of platinum. It is slurried with water, and then enough strong acid resin is added (such as sulfonated styrene divinyl benzene in the hydrogen form — DOWEX-50, for example), to replace three of the Na atoms. The solution is filtered to remove resin and then passed through an ion-exchange column with sufficient of the said acid resin to replace the other three Na atoms. Inherently, during this two-step cation exchange, copious quantities of $SO_2$ are liberated, amounting to a loss of substantially two moles of $SO_2$/mole Pt. Boiling to concentrate the solution, results in the novel complex sulfite platinum acid compound above discussed containing groups of (OH) and Hthd $3Pt$ $(SO_3)_2$, free of excess unbound $SO_2$.

In compliance with a requirement in the earlier applications from which the present application is continued, for evidence of the reasons for the conclusion as to the above formulations, a summary of such evidence is herein presented, though it is not in any way part of the essential disclosure of this application and is not required for the practice of the invention as originally disclosed, since precisely following the steps of the disclosure of said applications will produce the precise products and results of the invention as originally described.

Proof of the above-stated complex character of this novel platinum acid has been obtained by reacting 0.0740 g-mole of chloroplatinic acid in the form of the commercial material containing 40% by weight of Pt to form the "white precipitate" precisely in accordance with the method described above and in the said prior applications. The "white precipitate" weighed 48.33 g, after filtering, washing and drying at 150° C (to constant weight). The filtrate contained 40 ppm platinum, as determined by atomic adsorption, showing that more than 99% of the original platinum contained in the sample of chloroplatinic acid was present in the precipitate. Thus, the precipitate has an empirical formula weight of about 653 based on one atom of Pt [48.33/0.0740]≈653. Chemical analysis showed that the salt contained 21'%

Na (by atomic adsorption), 29.9% Pt (by atomic adsorption) and 48.7% $SO_3$ (by oxidative fusion and $BaSO_4$ precipitation and by $KMnO_4$ titration), thereby confirming the presence of substantially 6 Na and 4 $SO_3$ per Pt atom.

The precipitate was then converted to the complex acid solution in accordance with the precise procedure described above and in said prior applications. It was boiled to a concentration approximately 2 molar in Pt (2 g atoms Pt/liter of solution).

When the acid was concentrated to this strength, $SO_2$ was no longer evolved.

1. A sample of substantially water-free complex platinum acid, prepared by distillation under high vacuum, was found to contain 52% Pt by weight determined by thermogravimetric analysis.
2. A sample of complex platinum acid (in solution) was found to have a sulfur content of 42 % by weight, as $SO_3$, determined by oxidative fusion and $BaSO_4$ precipitation and by oxidometric titration with $KMnO_4$, i.e. 2 moles of sulfite/mole Pt.
3. Titration of a sample of the complex platinum acid with standard base showed a characteristic titration curve with three titratable hydrogen ions per atom of Pt, amounting to 0.8% by weight, two of which were strongly acid (i.e. completely dissociated) and the third quite weakly acid ($K_a \sim 10^{-8}$ for the third $H^+$ ion).
4. A sample of complex platinum acid was found to contain one OH group per atom Pt, or 4.54% by weight OH, determined by neutralizing the three acid hydrogens with NaOH to pH 9.5, then reacting with excess sodium sulphite solution of natural pH = 9.5, thereby gradually reforming white precipitate having the above described composition, and raising the pH of the reaction mixture above 12, and back-titrating with $H_2SO_4$ to pH 9.5.
5. A sample decomposed at about 400° C in nitrogen yielded only oxides of sulfur ($SO_2$ and $SO_3$) and water in the gas phase, and Pt metal residue.
6. Addition of silver nitrate to the acid yielded a yellow product insoluble in dilute sulfuric acid.

From these experiments, the following is concluded:

1. The acid contains only H, O, Pt and S. (The replacement of $Na^+$ by $H^+$ in the ion exchange step cannot introduce any other element); Cl is absent.
2. The acid contains Pt and S in the ratio of 1:2.
3. The sulfur is present as sulfite as shown by the analysis and by the high temperature decomposition of the acid in nitrogen.
4. The sulfite has to be complexed because (a) the complex acid (no $SO_2$ odor) is completely dissociated whereas the ionization constants of $H_2SO_3$ (which is odorous) are $1.54 \times 10^{-2}$ and $1.02 \times 10^{-7}$, respectively; (b) the complex acid is more soluble in water than $H_2SO_3$ at the boiling point (max. solubility of $SO_2$ is 5.8g/l or 0.07 molar in $H_2SO_3$ at 100° C vs. the 2 molar acid produced by the method of this invention); and (c) silver sulfite is soluble in dilute sulfuric acid, whereas the silver salt of the new complex platinum acid is insoluble in dilute sulfuric acid.
5. The acid is trivalent, having two strongly acidic and a third weakly acidic hydrogen as evidenced by a characteristic titration curve. An unusual kinetic effect occuring during titration of the third hydrogen suggests the possibility that it could be part of the sulfite ligand.

Turning back, now, to the said "white precipitate", and in view of the Patent Office requirement promulgated since the filing of the said earlier applications for disclosure of all known pertinent prior art, attention is invited to "The Chemistry of the Co-ordination Compounds", edited by John C. Bailar Jr., ACS Monograph, Reinhold Publishing Co., 1956, p. 57–58, where a compound of composition $Na_6Pt(SO_3)_4$ is disclosed (with no reference to any utility), but as having to be prepared by the complicated process of making the appropriate isomer of a platinum ammine chloride, $Pt(NH_3)_2Cl_2$, and then converting it to $NaPt(SO_3)_4$. This further points up the highly novel and greatly simplified high-yield technique of the present invention, starting with chloroplatinic acid and preparing the sodium platinum sulfite complex "white precipitate" for which the present invention has found and taught important utility in the development of the novel complex platinum acid of the invention), substantially quantitatively.

From this novel complex platinum acid, a new colloidal sol may be prepared by decomposing the acid by heating it to dryness in air (oxidizing) and holding the temperature at about 135° C for about an hour, producing a black, glassy material which, when dispersed in water, yields a novel colloidal platinum-containing sol having an average finely divided platinum particle size of from about 15–25 Angstroms, with substantially all the platinum particles consistently lying within this range. Some platinum metal and sulfuric acid may be present and may be respectively removed by filtering (and re-cycling use of the metallic platinum) and by treating with hydroxide resin such as DOWEX 2 or the like. A jet black colloidal sol with these fine size particles is thus obtained.

From this novel product, a host of vastly improved catalytic surfaces have been obtained.

As a first example, the sol has been deposited or adsorbed on a carbon black substrata (such as electrically conductive Norit A) to form a catalytic electrode structure (by means well known in the art and comprising a conventional current collector). One of the uses of such an electrode structure for example, is as a cathode electrode in fuel cells and the like. This has been effected by reducing the adsorbed metal of the sol with hydrazine; forming on the carbon, platinum metal crystals of measured approximately 20-Angstrom size. For use as an oxygen cathode electrode in an air-hydrogen 135° C fuel cell with phosphoric acid electrolyte and a platinum anode, with both electrode sizes about 1 inch by 1 inch, about 2–10% by weight of adsorbed platinum was so reduced with about 10% solution of hydrazine to form and adhere the fine particulate platinum on the electrically conductive carbon stubstrate, the electrode structure exclusive of conventional components being about 70% by weight of Norit A carbon and 30% by weight of Teflon (i.e. a typical fluorinated hydrocarbon polymer) emulsion, such as TFE 30. Most remarkable cathode performance was obtained in this fuel cell, with cathode loading of only 0.25 milligrams/$cm.^2$ of platinum, as follows:

| Current | Voltage |
|---|---|
| amperes/$ft.^2$ | millivolts |
| 100 | 660 |
| 200 | 598 |
| 300 | 548 |
| 400 | 500 |

This improved performance is evident from the fact that in an identically operating cell with the cathode formed by adhering to the carbon substrate platinum particles from platinum black of nominal surface area of 25 meters $^2$/gram, such cell performance could only be obtained with ten times the platinum loading (i.e. 2 milligrams/cm.$^2$). Similar performance could also be obtained in the same cell with the platinum deposited on the carbon from platinum tetrachloride and chloroplatinic acid (approximately 40–80 Angstrom particles), but only with three to four times the platinum loading. Prior phosphoric acid fuel cell operation with other platinum catalysts is described, for example, by W. T. Grubb et al., J. Electrochemical Society III, 1015, 1964, "A High Performance Propane Fuel Cell Operating in the Temperature Range of 150°–200° C". Prior methods of fabricating fuel cell electrodes are described, for example, in U.S. No. 3,388,004.

As another example, similar electrochemical cell electrodes were operated as air cathodes in the same cell as the first example with as little as 0.04 milligrams/cm.$^2$ platinum loading, and with as much as 0.5 milligrams/cm.$^2$. The respective cell performance characteristics were 100 amperes/ft.,$^2$ at 530 millivolts, and 100 amperes/ft.$^2$ at 690 millivolts.

The above-described catalytic electrode structures have other advantages, for example when used as hydrogen anode electrodes in fuel cells and the like. As an illustration, the electrode structure described above as a first example, was used as novel hydrogen anode electrode in the above mentioned air-hydrogen fuel cell in lieu of the (conventional) platinum anode also above mentioned. Remarkable anode performance was obtained in this fuel cell with low loadings between 0.05 and 0.25 milligrams of platinum per cm$^2$ of anode area, particularly with respect to improved tolerance of carbon monoxide. One known commercial method of producing low-cost hydrogen is by steam reforming of hydrocarbons followed by the shift reaction, which process yields an impure hydrogen containing typically of the order of 80% hydrogen, the remainder being $CO_2$, excess steam and of the order of 1%–2% carbon monoxide. It is well known in the fuel cell art that carbon monoxide is a poison for anodic platinum and that such poisoning is temperature dependent, the loss of anode performance being the more drastic, the lower the temperature. Using such low cost hydrogen, it is thus generally advantageous to operate the above phosphoric acid fuel cell at higher temperatures, for example in the range of 170° to 190° C. Remarkable anode performance in the presence of CO impurity, was obtained in this fuel cell, especially at high current densities, with an anode loading of 0.05 milligrams/cm$^2$ of platinum when compared to the performance of an anode having a conventional platinum catalyst (prepared by reaction of chloroplatinic acid and deposited in substantially the same manner) and having the same loading of 0.05 milligrams/cm$^2$, as shown in the following table.

| Cell Temperature | Current Density (Amps/sq ft) | Loss of Voltage (millivolts) by Polarization Due to 1.6% CO in Hydrogen | |
|---|---|---|---|
| | | Novel Anode | Conventional Anode |
| 190° C | 500 | 17 | 44 |
| 190° C | 400 | 10 | 28 |
| 190° C | 300 | 9 | 14 |
| 175° C | 500 | 66 | 118 |
| 175° C | 400 | 40 | 69 |
| 175° C | 300 | 22 | 38 |

In connection with the examples above, moreover, not only has greatly improved catalytic efficiency been obtained as a result of the extremely high surface area provided by such fine colloidal particles, but this enhanced activity was found to be maintainable over several thousand hours of operation with no detectable decay in cell performance.

As a further example, such catalytic structures for electrode use have also been prepared without the step of converting the complex platinum sulfite acid to the sol. Specifically, the acid was adsorbed on the carbon substrate, decomposed with air, and reduced with hydrogen. During such reduction, it was observed that $H_2S$ evolved, indicating the retention of sulfide materials; but the $H_2$ reduction at 400° C was found to remove substantially all sulfides. Again particles in the 20-Angstrom range were produced with similar electrode performance to that above-presented.

A still additional example is concerned with deposition or adhering to a refractory non-conductive substrate of alumina. Sufficient complex platinum sulfite acid to contain 200 milligrams of platinum was applied to 50 cc. of insulative eta-alumina pellets, about ⅛ inch by ⅛ inch. The mixture was dried at 200° C and, to effect decomposition and adsorption, was held at 600° C in air for about 15 minutes. This resulted in a very uniform distribution of fine platinum particles (approximately 20 Angstroms) throughout the alumina surface structure, but not within the same. This was reduced by $H_2$ at 500° C for about half an hour, providing a significantly improved oxidation catalyst having the following properties, considerably improved from Houdry Platinum-on-Alumina Catalyst Series A, Grade 200 SR, a typical presentday commercial product, under exactly comparable conditions:

| Ignition Temperature For | Invention | Houdry |
|---|---|---|
| 1. Methane | 355° C | 445° C |
| 2. Ethanol | 85° C | 125° C |
| 3. Hexane | 145° C | 185° C |

Another example, again bearing upon this oxidation catalyst application, involves the same preparation as in the immediately previous example, but with two and a half times the amount of particulated platinum (i.e. 500 milligrams). The following results were obtained:

| Ignition Temperature For | Invention |
|---|---|
| 1. Methane | 340° C |
| 2. Ethanol | 30° C (room temperature) |
| 3. Hexane | 130° C |

Still another example, identical to the previous one, but with 2 grams of platinum adhered to the 50 cc alumina, was found to produce the following results:

| Ignition Temperature For | Invention |
|---|---|
| 1. Methane | 250° C |

-continued

| Ignition Temperature For | Invention |
|---|---|
| 2. Ethanol | 30° C (room temperature) |
| 3. Hexane | 90° C |

Still another example, 200 milligrams of the preformed sol was adsorbed on alumina, and reduced with $H_2$ and found to produce the following results:

| Ignition Temperature For | Invention |
|---|---|
| 1. Methane | 310° C |
| 2. Ethanol | 45° C |
| 3. Hexane | 110° C |

For the usage of the last four examples, a range of platinum of from about 0.01% to 5% may be most useful, depending upon the economics and application.

As still a further example, the deposition or adsorption described in the last four examples, above, may also be effected on other refractory oxides in similar fashion, including silica and zirconia.

Lastly, other refractories, such as zeolites, calcium phosphate and barium sulfate, may be similarly coated by the processes of the last four examples.

While the novel complex platinum compounds, acid and/or sol may be prepared by the preferred method previously described, it has been found that the acid may also be prepared from hydroxyplatinic acid ($H_2Pt(OH)_6$) by dissolving the same cold in about 6% aqueous $H_2SO_3$, and evaporating to boil off excess $SO_2$. This appears to yield the complex platinum sulfite acid material, also (identified by its characteristic titration curve). While this process involves a lower pH, it should be noted that chloride is excluded by the starting material.

The above-described methods for the preparation of several platinum compounds of unexpected utility as sources of superior catalysts for fuel cells, oxidation catalysts, etc. have proven quite satisfactory; specifically, for producing (I) the water-insoluble salt characterized to have the composition of $Na_6Pt(SO_3)_4$: (II) the complex sulfite-platinum compound, soluble in water, and having an empirical formula and composition represented substantially by $H_3Pt(SO_3)_2OH$; and (III) the colloidal dispersion or sol of a platinum compound of unknown composition, but formed by the oxidative, thermal decomposition of (II).

Among the important before-described uses for these compounds is the preparing of fuel cell catalysts, consisting of platinum supported on carbon, having superior electrocatalytic properties.

Subsequent work has revealed new, unexpected and simplified means and steps of preparing such superior forms of fuel cell catalysts. The basis for all of the syntheses of a carbon-supported platinum fuel cell catalyst is the formation of a platinum colloid, capable of being deposited on carbon to yield platinum supported on carbon of average particles size range of substantially of the order of 15–25 Angstroms, either as a colloid, as before described, which can be subsequently contacted with finely divided carbon, or as hereinafter described, as colloid generated in the presence of such carbon, thereby causing the colloidal platinum particles to be formed and deposited on the carbon in a single step. We will now describe in detail one especially advantageous technique which involves, typically, the step of oxidizing the sulfite ligand of the preferred complex platinum compounds (I) and (II) to sulfate, in aqueous solution, by means of a non-complexing oxidant, it being understood that other platinum complexes containing ligands capable of being oxidized to substantially non-complexing products are also suitable, as later discussed.

Techniques for preparing a fuel cell catalyst, equivalent to that found from the complexes (I) or (II), have been discovered, wherein chloroplatinic acid (CPA) and sulfite are reacted, to yield (II), but wherein, unlike the before-described methods, the complex acid (II) is never separately isolated, but is converted to a catalyst directly, and without isolation from by-products, such as NCl and NaCl.

An illustration of the synthesis of a carbon-supported platinum fuel cell catalyst is the observation of the oxidizing reaction of the complex platinum sulfite acid (II) with $H_2O_2$. When $H_2O_2$ is added to a dilute solution of the complex acid (II), the sulfite present in the sulfite-platinum complex, is oxidized. The solution's color slowly changes from a faint yellow, to orange. Following the appearance of the orange color, a faint Tyndale effect is noted. With time, this becomes more pronounced; the solution becomes cloudy, and finally, precipitation occurs. While the material precipitated is of unknown exact composition, it is believed to be a hydrated oxide of platinum, since it is soluble in base much as is hydrated platinum hydroxide or platinic acid, $H_2Pt(OH)_6$. In any case, treatment of the complex platinum sulfite acid (II) with $H_2O_2$ yields a meta-stable colloid of a platinum compound. The sequence of reactions described above are hastened with heat, and proceed more slowly with increasing acidity, as from the addition of sulfuric acid.

Whereas in the earlier-described methods, the platinum colloidal sol is first formed and then applied to the carbon particle substrate, if the reaction described immediately above is performed in the presence of the high surface area carbon, the carbon particles act both as nuclei and as a support for the extremely small particles of the platinum compound, as they are formed, and they are deposited on the carbon rather than coalescing to yield a lower surface area precipitate. It has been found that this carbon nucleation of the platinum particles permits the restriction of the platinum deposits to particulate catalytic particles of the said preferred 15–25 Angstrom size range.

It has also been found that the same reaction occurs if the complex sodium platinum sulfite precipitate (I) is acidulated by dissolving in dilute sulfuric acid, and is then oxidized by treatment with $H_2O_2$; or if CPA is reacted with $NaHSO_3$ or $H_2SO_3$, to yield a sulfite-platinum complex, and then oxidizingly treated with $H_2O_2$.

Several examples of the use of the reactions observed above are given below. Basically, however, they all depend upon the oxidation of the sulfite present in a platinum-sulfite complex, with $H_2O_2$ being the preferred oxidant, although other non-complexing oxidants, such as potassium permanganate, persulfuric acid and the like have been used. The term "non-complexing oxidant", as used in this specification and in appended claims, means an oxidant which does not introduce groups capable of forming strong complexing ligands with platinum. Also while any high surface area carbon is suitable, the carbon black, Vulcan XC-72 (Cabot Corp.), has been found to yield an excellent catalyst; but the fact that this carbon is used in the examples to be cited does not imply that other carbons cannot be used. Nor, since the carbon is merely a support onto which to deposit the colloidal particles of platinum as they are formed, should it be thought that carbon is the only support upon which the deposit can be made. Other materials such as $Al_2O_3$, $BaSO_4$, $SiO_2$, etc. can be used as supports for a high surface area platinum, as previously described, but are, of course, useful for other catalytic properties rather than for fuel cells, electrodes and the like, because of their high electrical resistance. We shall now proceed to a further series of examples.

EXAMPLE 1

To a liter of water, sufficient of complex platinum sulfite acid (II) is added to give a platinum concentration of 2.5 g/l. To this solution is added 22.5 grams of Vulcan XC-72. The solution has an initial pH of about 1.8 which is unaltered by the addition of carbon. The solution is stirred vigorously, so as to keep the carbon well dispersed. Add 50 ml of 30% $H_2O_2$, while continuing the vigorous stirring. Maintain the stirring for about one hour. The pH will drop slowly, indicating that hydrogen ions are being generated. Next, heat the solution to boiling, while maintaining the stirring. Filter the carbon, wash it well with water, and dry the carbon in an oven set to 100°–140° C. This air-dried material is now ready for use without further treatment. Platinum uptake is about 98% with the remainder being discharged to the filtrate. The resulting carbon, containing 9.9–9.85 platinum shows platinum crystallites of 5–20 Angstroms in diameter by electron microscopy. Fuel cell performance was measured using Teflon bonded anodes and cathodes having platinum loadings of 0.25mg/cm² of electrode area. Performance with $H_2$ and air, at 190° c in a phosphoric acid fuel cell, was measured and found to give 200 Amperes per square foot (ASF) at 0.670–0.680 V. The resistance loss was about 0.02 volts at this current density, so the IR-free performance was about 0.700 Volts as 200 ASF.

EXAMPLE 2

The reaction was conducted as in Example 1, but rather than heating the solution after 1 hour, stirring was continued for 24 hours at ambient temperature. Platinum uptake was 97–98%, and physical and electrochemical properties substantially identical to the produce described in Example 1 were obtained.

EXAMPLE 3

The reaction of the complex platinum sulfite acid (II) with $H_2O_2$ was conducted much as in Example 1, except the pH of the solution was adjusted to 3 with NaOH, prior to the addition of $H_2O_2$. After the 1 hour reaction period, the pH was again brought to 3 with NaOH, and the solution boiled. Th carbon was filtered, washed, and dried, as previously described. Platinum uptake was substantially quantitative, and the physical and electrochemical properties of the product substantially identical to those described in Examples 1 and 2.

EXAMPLE 4

In 100 ml of $H_2O$, sufficient of the complex sodium platinum sulfite salt (I) was dissolved to yield a platinum concentration of 25 g/l. The salt was put in solution by the addition of sufficient $H_2SO_4$ to drop the pH to 2. This solution was diluted with $H_2O$ to volume of one liter, and reacted as described in Example 3. Platinum uptake was quantitative and the physical and electrochemical properites of the product substantially identical to those already described in the previous examples.

Before proceeding to Example 5, which describes a process that does not require the isolation of either of the complexes (I) or (II) but rather uses CPA heated with sulfite, it maybe useful to hypothesize upon the mechanism of the reactions taking place in Examples 1–4, since they have a bearing on the reaction of Example 5, and will help to explain some of the difficulties of control noted in Example 5; though the invention is not dependent upon the accuracy of such hypothesis, it being sufficient to describe the steps that do indeed work and produce the results of the invention.

It is believed, however that when $H_2O_2$ is added to either the sodium platinum sulfite complex (I) or the like, dissolved in dilute $H_2SO_4$, or to a solution of the platinum sol (III), the sulfite or like ligand is destroyed. Since it is the complexing power of sulfite which is the stabilizing force in maintaining an ionic platinum species, its oxidation to sulfate destroys this stabilizing force. Sulfate is, at best, a feeble complexing agent for platinum, whether it is $Pt^{II}$ or $Pt^{IV}$. With the removal of the sulfite, there does not exist a favorable environment for maintaining a soluble species of platinum, and the platinum species just formed upon the destruction of the stabilizing sulfite must slowly hydrolize and in the process has a transient existence as extremely small colloidal particles. It is these particles which are deposited on the carbon yielding the active catalytic structure. It is believed that the reactions of Examples 1–3 can be adequately described as being substantially:

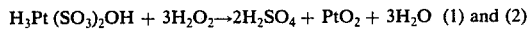

$H_3Pt(SO_3)_2OH + 3H_2O_2 \rightarrow 2H_2SO_4 + PtO_2 + 3H_2O$ (1) and (2)

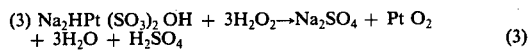

(3) $Na_2HPt(SO_3)_2OH + 3H_2O_2 \rightarrow Na_2SO_4 + PtO_2 + 3H_2O + H_2SO_4$ (3)

Example 4 is somewhat different, in that the starting material is different. However, it would appear that when the complex salt of composition $Na_6Pt(SO_3)_4$ is dissolved in $H_2SO_4$, the complex acid of composition $H_3Pt(SO_3)_2OH$ is formed, since there is a vigorous evolution of $So_2$, and when the $SO_2$ is evolved, the characteristic titration curve of $H_3Pt(SO_3)_2OH$ is observed. Hence, the reaction of Example 4 is apparently similar to that of Example 3.

In Example 5 presented below, however, CPA is reacted with $NaHSO_3$ to yield a complex believed to be the complex acid of composition $H_3Pt(SO_3)_2OH$, and HCl and NaCl are formed. One possible reaction is substantially as follows:

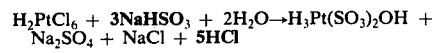

$H_2PtCl_6 + 3NaHSO_3 + 2H_2O \rightarrow H_3Pt(SO_3)_2OH + Na_2SO_4 + NaCl + 5HCl$ However, when this mixture is treated with $H_2O_2$, the presence of chloride, along with the high acidity, leads to the formation in part, of $H_2PtCl_6$, rather than the desired colloidal species. To minimize this effect, the platinum concentration must be kept low (in order to keep the chloride concentration low) and the pH closely controlled.

EXAMPLE 5

Dissolve 1 gram of CPA (0.4 gm Pt) in 100 ml water. Add 2 grams of $NaHSO_3$ and heat until the solution turns colorless. Dilute to 1 liter with water and adjust the pH to 5 with NaOH. Add 3.6 grams of Vulcan XC-72, and while stirring add 50 ml of 30% $H_2O_2$. Continue to stir and as the pH changes, add NaOH to maintain the pH between 4 and 5. When the pH has stabilized, heat the solution to boil, and filter and wash the carbon. Platinum pickup is variable, but in general is about 90%. Increasing the platinum concentration decreases the percentage of platinum deposited upon the carbon since the conversion of $H_2PtCl_6$ is favored. The catalyst formed in this way, has been found to be substantially identical in performance to that made in Examples 1-4.

As compared with the earlier described methods of said prior applications, also embodied herein, the additional methods, supra, avoid the conversion of the compound having the composition of $Na_6Pt(SO_3)_4$ to that of composition $H_3Pt(SO_3)_2OH$, and then to the colloidal sol material. This latter colloid, in turn, must then be applied to carbon, filtered, dried, and reduced in $H_2$, in accordance with the earlier methods. As described in Example 4, however, the compound of composition $Na_6Pt(SO_3)_4$ is dissolved in acid, reacted with $H_2O_2$ in the presence of carbon, the product filtered, washed and dried and with no $H_2$ reduction necessary, since the sintering temperature required to prepare the electrodes is ample to decompose the adsorbed species to the catalytically-active platinum particles.

EXAMPLE 6

5 g of the precipitate having the composition corresponding to $Na_6Pt(SO_3)_4$ is suspended in about 100 cc of water and reacted with a large excess of the ammonium form of Dowex 50 (a sulfonated copolymer of styrene and divinylbenzene) cation exchange resin in bead form until the precipitate is dissolved. The pH of the resulting solution is about 4. After filtration, the solution is passed through a column of Dowex 50 in the ammonium form until all of the sodium is removed. The resulting platinum sulfite complex in solution is then oxidized with hydrogen peroxide in the presence of finely divided carbon, using the procedure of Example 1, yielding a nearly equivalent electro-catalyst.

Similar results are obtainable by first neutralizing to pH 9 a solution of the complex compound corresponding to $H_3Pt(SO_3)_2OH$ with aqueous ammonia which neutralization requires almost five moles of $NH_3$ (instead of only 3 moles in the case of neutralization by NaOH), then acidifying the solution to pH 3 with sulfuric acid, and oxidizing with $H_2O_2$ in the presence of carbon, again using the procedure of Example 1.

In both the earlier methods of the said applications and the additional methods supplementarily discussed herein, however, common over-all steps are involved of forming the complex sodium platinum sulfite precipitate from CPA, acidifying the same and developing the complex platinum sulfite acid and oxidizing such into a platinum colloidal sol, which is applied to the carbon particle substrate and reduced to form the conduction catalytic fuel cell or related electrode.

While the above examples relate to a complex platinum sulfite as the starting material for an appropriate platinum colloid, other platinum complexes comprising oxidizable ligands can be similarly used, as before stated, to produce suitable platinum colloids by means of a non-complexing oxidant, as illustrated in the next Example 7.

EXAMPLE 7

Four grams of platinic acid, $H_2Pt(OH)_6$, were dissolved in 25 milliliters of 1 molar NaOH. Six grams of sodium nitrite were dissolved in this solution and then the mixture was diluted to a volume of 800 milliliters with water. The pH was then reduced from about 11 to pH of 2 with $H_2SO_4$. During this process, a precipitate formed and re-dissolved as the pH approached 2, thereby forming a platinum nitrite complex. To this solution, 18 grams of finely divided carbon (Vulcan XC-72) were added, and while vigorously stirring, 200 millileters of 3% $H_2O_2$ were added. The pH dropped to 1.4 substantially instantaneously. The resulting platinum-catalyzed carbon was filtered, washed and dried. Fuel cell performance for 0.25 milligram per square centimeter electrodes of this material in a phosphoric acid fuel cell at 190° C, was 640 millivolts at 200 amperes per square foot, with hydrogen and air.

In this case, the lower performance of this platinum nitrite complex, as compared with the platinum sulfite complex, appears attributable to the fact that the colloidal state is rapidly produced and persists only for a very short time, followed by precipitation; whereas in the case of the platinum sulfite complex, the oxidation proceeds slowly and the colloid is stable over long periods of time.

As before explained, in general, suitable electrocatalysts are prepared by depositing platinum of the 15-25 Angstrom particle size on finely divided conducting carbon. It as also been found possible to prepare colloidal solutions, though not quite so efficacious, by the use of solutions of non-complex platinum salts from which colloidal solutions can be made, for example, by the use of an appropriate hydrolysis technique, as illustrated by Examples 8 and 9.

EXAMPLE 8

Four grams of platinic acid, $H_2Pt(OH)_6$, were dissolved in 10 millileters concentrated $HNO_3$. This solution was slowly added to one liter of water containing 18 grams of finely divided carbon (Vulcan XC 72) while vigorous stirring was maintained for one hour, and then the pH was adjusted to 3 with NaOH, while continuing stirring. The dispersion was then boiled, while stirring. This colloid was thus produced by hydrolizing a non-complex platinum salt solution at the above appropriate pH. The resulting platinized carbon was filtered, washed and dried. Fuel cell electrodes were fabricated therefrom having a platinum loading of 0.25 milligrams per square centimeter and a phosphoric acid fuel cell constructed. Performance with hydrogen and air at 190° C was 660 millivolts at 200 amperes per square foot.

EXAMPLE 9

The experiment of Example 8 was repeated except 6 molar $H_2SO_4$ was substituted for nitric acid, this time producing the colloid by hydrolyzing the non-complex platinum salt resulting from the $H_2SO_4$ reaction at the same pH of about 3. Fuel cell performance under similar conditions as in Example 8 was 667 millivolts at 200 amperes per square foot.

The platinized carbon electrodes produced with the non-complex platinum sols of Examples 8 and 9, while most useful for the purposes described, have given somewhat lower fuel cell voltages at the same current densities than electrodes made from the preferred platinum sulfite complex, before discussed, apparently because of the difficulties involved in controlling the hydrolysis conditions required for the non-complexing platinum salt processes.

As before stated, while only illustrative electrode and other catalytic uses have been described, the invention is clearly applicable to a wide variety of electrodes, oxidation, hydrogenation, de-hydrogenation, reforming, cracking, chemical reaction-aiding, contaminant burning and other uses, as well, further modifications will also occur to those skilled in this art and all such are considered to fall within the spirit and scope of the invention as defined in the appended claims.

What is claimed is:

1. In a fuel cell and the like, a catalytic electrode comprising an electrically conductive high surface area substrate on which has been deposited platinum particles of the order of substantially 15 to 25 Angstroms in particle size and in which said particles are formed from one of an oxidative decomposition of a platinum complex comprising an oxidizable ligand, and hydrolysis of a non-complex platinum salt solution.

2. In a fuel cell and the like, a catalytic electrode as claimed in 1 and in which the platinum loads the electrode surface in the range of from substantially 0.04 milligrams/cm$^2$ to 0.5 milligrams/cm$^2$.

3. In a fuel cell and the like, a catalytic electrode comprising an electrically-conducting high surface area carbon substrate on which has been deposited substantially uniformly platinum particles having a particle size substantially in the range of 15 to 25 Angstroms and being formed from the oxidative decomposition of a platinum complex comprising an oxidizable ligand.

4. In a fuel cell and the like, a catalytic electrode as claimed as in claim 3 and in which said complex is selected from the group consisting of platinum sulfite and platinum nitrite complexes.

5. In a fuel cell and the like, a catalytic electrode as claimed in claim 4 and in which said particles are reduced subsequent to said oxidative decomposition.

6. In a fuel cell and the like, a catalytic electrode as claimed in claim 4 and in which the platinum loads the electrode surface in the range of from substantially 0.04 milligrams/cm$^2$ to 0.5 milligrams/cm$^2$.

7. In a fuel cell and the like, a catalytic electrode as claimed in claim 4 and in which said platinum sulfite complex is the compound having the composition corresponding substantially to $H_3Pt(SO_3)_2OH$.

8. A fuel cell comprising a catalytic electrode having an electrically-conducting high surface area carbon substrate on which has been deposited substantially uniformly platinum particles having a particle size substantially in the range of 15 to 25 Angstroms and formed from the oxidative decomposition of a platinum complex comprising an oxidizable ligand, said complex being selected from the group consisting of platinum sulfite and platinum nitrite complexes and said particles being reduced subsequent to said oxidative decomposition, said fuel cell being a phosphoric acid electrolyte fuel cell with air-hydrogen electrode supply means, and said electrode being provided with means for enabling the drawing of current flowing through the cell.

9. A fuel cell as claimed in claim 8 and in which said electrode is a catalytic anode, and in which said air-hydrogen electrode supply means comprise a source of hydrogen containing carbon monoxide impurity.

10. A fuel cell as claimed in claim 9 wherein said catalytic anode has a platinum loading in the range of from substantially 0.04 milligrams/cm$^2$ to 0.25 milligrams/cm$^2$.

11. A fuel cell as claimed in claim 8 and in which the said carbon is composited with fluorinated hydrocarbon polymer.

12. In the method of preparing electrodes for fuel cells and the like comprising platinum-on-carbon electro-catalyst, the steps of providing aqueous colloidal platinum-containing sol having an average platinum particle size substantially of the order of 15–25 Angstroms, depositing said platinum contained in said sol on an electrically-conducting carbon substrate, and controlling the depositing to cause the carbon to nucleate the deposit and limit the formation of platinum particles on said carbon to said size.

13. In a fuel cell and the like, an electrode comprising a platinum-on-carbon electrocatalyst, said electrode being produced by a process including the steps of oxidizing the ligand of a complex platinum compound comprising an oxidizable ligand to substantially non-complexing products by means of a non-complexing oxidant, producing therefrom an aqueous dispersion comprising the products of said oxidation, depositing the platinum compound contained in said dispersion on an electrically conducting carbon substrate, and decomposing said platinum compound thereon, thereby forming platinum particles on said carbon having an average particle size of the order of substantially 15–25 Angstroms.

14. In a fuel cell and the like, an electrode produced by the process of claim 13 wherein said complex platinum compound is platinum sulfite and it is subjected to air oxidation.

15. In a fuel cell and the like, an electrode produced by the process of claim 14 wherein said complex platinum sulfite contains groups of (OH) and $H_3Pt(SO_3)_2$.

16. In a fuel cell and the like, an electrode produced by the process of claim 14 wherein said air oxidation is carried out at about 135° C.

17. In a fuel cell and the like, an electrode produced by the process of claim 13 wherein said dispersion contains the product of said complex platinum sulfite and a non-complexing oxidant, said oxidation being carried out in said dispersion.

18. In a fuel cell and the like, an electrode produced by the process of claim 17 wherein said oxidant is selected from the group consisting of hydrogen peroxide, potassium permanganate and persulfuric acid.

19. In a fuel cell and the like, an electrode produced by the process of claim 17 wherein said complex platinum sulfite is selected from the group of compounds having substantially the composition of $Na_6Pt(SO_3)_4$ and $H_3Pt(SO_3)_2OH$ and mixtures thereof.

20. In a fuel cell and the like, an electrode produced by the process of claim 17 wherein said complex platinum sulfite is the compound having the composition of $Na_6Pt(SO_3)_4$ and wherein said compound is in an aqueous sulfuric acid solution.

21. In a fuel cell and the like, an electrode produced by the process of claim 19 wherein said oxidation is effected with $H_2O_2$.

22. In a fuel cell and the like, an electrode produced by the process of claim 13 wherein said oxidation is carried out in the presence of said carbon substrate in finely divided form.

23. In a fuel cell and the like, an electrode produced by the process of claim 13 wherein said complex platinum compound is formed in said dispersion by reacting a solution of chloroplatinic acid and the like with a sulfiting agent.

24. In a fuel cell and the like, an electrode produced by the process of claim 23 wherein said oxidation is effected thermally in air, and said decomposing following depositing on the carbon is effected by reducing the same.

25. In a fuel cell and the like, a catalytic electrode comprising an electrically conductive high surface area carbon substrate on which has been deposited platinum particles of the order of substantially 15 to 25 Angstroms in particle size and in which said platinum loads the electrode surface in the range of from substantially 0.04 milligrams/cm$^2$ to 0.5 milligrams/cm$^2$.

26. A fuel cell comprising a catalytic cathode electrode having an electrically conductive high surface area carbon substrate on which has been deposited platinum particles substantially of the order of 15 to 25 Angstroms in particle size, said electrode having an electrode surface platinum loading within the range of from substantially 0.04 milligrams/cm$^2$ to 0.5 milligrams/cm$^2$, said fuel cell being an air-hydrogen high temperature fuel cell with a phosphoric acid electrolyte and being capable of producing in excess of 100 Amperes per square foot of electrode area at a cell voltage of at least 0.5 volts.

27. A fuel cell as claimed in claim 26 and in which the platinized carbon is admixed with a fluorinated hydrocarbon polymer.

28. A fuel cell comprising a catalytic anode electrode having an electrically conductive high surface area carbon substrate on which has been deposited platinum particles substantially of the order of 15 to 25 Angstroms in particle size, said electrode having an electrode surface platinum loading within the range of from substantially 0.04 milligrams/cm$^2$ to 0.5 milligrams/cm$^2$, said fuel cell being an air-hydrogen high temperature fuel cell with a phosphoric acid electrolyte, said hydrogen comprising carbon monoxide impurity, and said fuel cell being capable of producing in excess of 100 Amperes per square foot of electrode area at a cell voltage of at least 0.5 volts.

29. A fuel cell as claimed in claim 28 and in which the platinized carbon is admixed with a fluorinated hydrocarbon polymer.

30. A fuel cell as claimed in claim 28, and in which said fuel cell comprises a catalytic cathode having an electrically conductive high surface area carbon substrate on which substrate has been deposited platinum particles substantially of the order of 15 to 25 Angstroms in particle size, the platinum loading of the cathode surface being within the range of from substantially 0.04 milligrams/cm$^2$ to 0.5 milligrams/cm$^2$, said fuel cell having connected thereto fuel and oxidant supply means and means for enabling drawing current through the cell.

31. A fuel cell as claimed in claim 26 and in which means is provided for operating said cathode electrode at a temperature of from substantially 135° to substantially 190° C.

32. A fuel cell as claimed in claim 28 and in which means is provided for operating said anode electrode at a temperature of from substantially 170° to substantially 190° C.

33. A fuel cell comprising a catalytic electrode having an electrically conductive high surface area carbon substrate on which has been deposited platinum particles of the order of substantially 15 to 25 Angstroms in particle size and formed from a complex platinum sulfite selected from the group of compounds having substantially the composition of $Na_6Pt(SO_3)_4$ and $H_3Pt(SO_3)_2OH$ and mixtures thereof.

34. A fuel cell as claimed in claim 33 and in which said fuel cell comprises an additional electrode, an electrolyte, fuel and oxidant supply means, and means for enabling the drawing of current flowing through the cell.

* * * * *